UNITED STATES PATENT OFFICE.

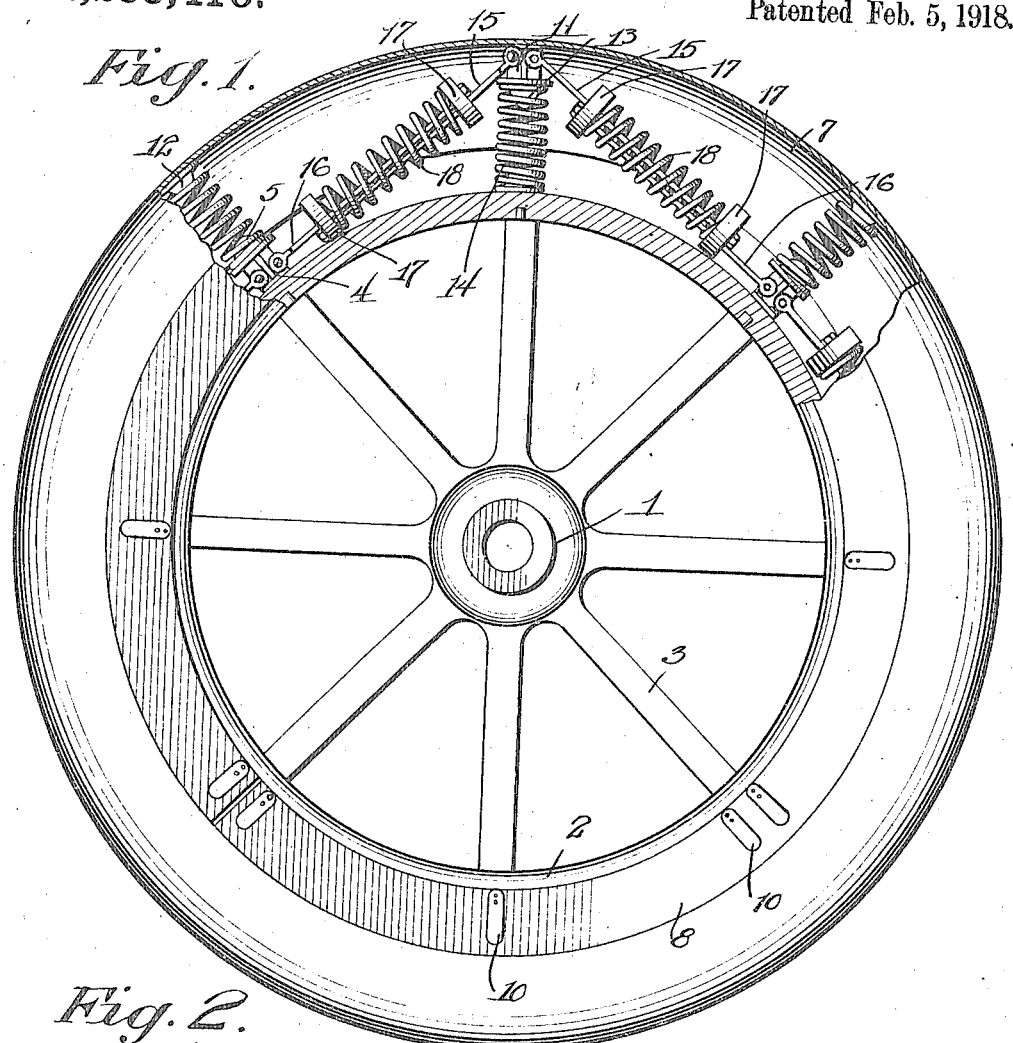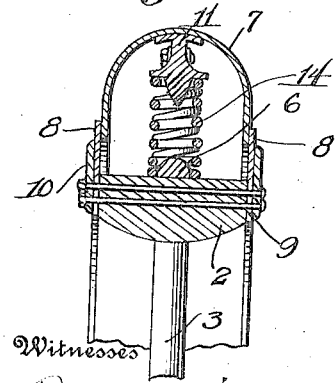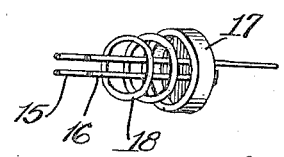

MATHEW E. HEATH, OF FREEWATER, OREGON.

SPRING-WHEEL.

1,255,416.  Specification of Letters Patent.  Patented Feb. 5, 1918.

Application filed July 26, 1915. Serial No. 41,943.

*To all whom it may concern:*

Be it known that I, MATHEW E. HEATH, a citizen of the United States, residing at Freewater, in the county of Umatilla and State of Oregon, have invented certain new and useful Improvements in Spring-Wheels, of which the following is a specification.

My invention relates to new and useful improvements in wheels and more particularly to a wheel of the resilient or spring type.

The primary object of the invention is the provision of springs within the tire portion of the wheel whereby it is not necessary to employ the expensive pneumatic tire now commonly in use.

A further object of the invention is the construction of the wheel whereby the strain on the several springs will be equalized in such a manner as to take up all unusual jar.

A still further object of the invention is the provision of means whereby the springs may be removed and new ones replaced in case of wear or breaking.

With these and other objects in view the invention consists in the novel details of construction and arrangement of parts which will be more clearly understood from the following description and drawings, in which, Figure 1 is a view in side elevation partly in section.

Fig. 2 is a radial section through the tire of the wheel, and

Fig. 3 is a fragmental perspective detail of the spring.

In the drawings, the numeral 1 indicates the hub of the wheel of ordinary construction, 2 the felly, and 3 the spokes secured between the felly and hub. Secured to the outer periphery of the felly are a plurality of castings indicated at 4, said castings having a knob or projection 5 formed on the top surface thereof and the purpose of which will be presently described. On the outer periphery of the felly 2 intermediate the castings 4 are formed projections or knobs, indicated at 6.

An inverted U-shaped tire is indicated at 7, and may be of any desired material but is preferably formed of thin metal. The tire operates between plates 8 secured to each side of the felly 2, said plates being held in position by means of bolts 9 which pass through small plates 10 engaging the sides of the plates 8 and said bolts 9 also pass through the felly, as clearly shown in Fig. 2 of the drawings. Castings 11 and knobs or projections 12 are secured to the inner periphery of the tire 7, the castings 11 being in alinement with the knobs or projections 6 secured to the felly and the knobs or projections 12 being in alinement with the castings 4 secured to the felly.

The castings 11 are provided with knobs or projections 13 the same as the knobs or projections 5 formed on the castings 4 and the purpose of which will be presently described.

Coil springs 14 are arranged between the felly and tire, as clearly shown in the drawings, said coil springs surrounding the projections formed on the castings and the knobs or projections arranged intermediate the castings. A pair of rods 15 and 16 are pivotally connected to the castings 11 and 4, respectively, and the opposite ends of said rods are adapted to overlap, as is clearly shown in the drawings, and pass through plates or disks 17 and are secured in position thereto by means of nuts, as is shown. Surrounding the two pairs of rods 15 and 16 are coil springs 18, said springs being received between the disks or plates 17.

As is clearly shown in the drawings the rods 15 and 16 extend diagonally from the felly to the tire, the purpose of which will be presently described.

Having fully described the detailed construction of my wheel it is thought that the objects and advantages will be clearly understood. As is a well known fact pneumatic tires have become exceedingly expensive and are objectionable in view of the fact that they are liable to punctures or blowouts. It is the object of my invention to do away with the pneumatic tire and to substitute therefor a spring tire which will have substantially the same resiliency as the pneumatic tire and to overcome excessive jars caused by unevenness in the roads. The coil springs 14 will take up all vertical strain and the springs 18 will take up the circumferential strain caused by the rotation of the wheel. By arranging the various springs as is shown and described the strain is equalized and the tire can give in all directions the same as a pneumatic tire. It will be further seen that I have provided a wheel of such construction should one of the springs become broken it can be readily replaced without disturbing the other springs.

The plates 8 on the side of the felly are preferably formed in sections whereby one section may be removed without disturbing the other. As is described above, the tire 7 operates between the plates 8 and the plates will exclude dirt or other foreign substances from entering the tire.

Having fully described the invention what I claim as new and desire to secure by Letters Patent, is:—

A wheel comprising a hub, a felly, spokes connecting the hub and felly, a tire slidably mounted on the felly, castings secured to the tire and felly, said castings having flanges formed thereon and ribs adjacent the flanges, projections formed on the tire and felly intermediate the castings, the casting on the tire being in alinement with the projections on the felly and the castings on the felly being in alinement with the projections on the tire, coiled springs held between the flanges of the castings and the alining projections, rods pivotally connected to the ribs of the tire and felly castings and having their free ends overlapping, disks secured to the rods, and coiled springs surrounding the rods between the disks.

In testimony whereof I affix my signature in presence of two witnesses.

MATHEW E. HEATH.

Witnesses:
G. W. PEARSON,
CHARLES FOX.

Copies of this patent may be obtained for five cents each, by addressing the "Commissioner of Patents, Washington, D. C."